United States Patent
Collom (10) Patent No.: US 9,210,843 B1
(45) Date of Patent: Dec. 15, 2015

(54) DUAL BALE LIFT WITH LONGITUDINAL AND MACHINERY PIVOTS

(71) Applicant: Langdon J. Collom, Eagle Bend, MN (US)

(72) Inventor: Langdon J. Collom, Eagle Bend, MN (US)

(*) Notice: Subject to any disclaimer, the term of this patent is extended or adjusted under 35 U.S.C. 154(b) by 36 days.

(21) Appl. No.: 14/167,997

(22) Filed: Jan. 29, 2014

(51) Int. Cl.
*A01D 87/12* (2006.01)

(52) U.S. Cl.
CPC ............ *A01D 87/127* (2013.01); *A01D 87/122* (2013.01)

(58) Field of Classification Search
CPC .............. A01D 87/127; A01D 87/003; A01D 2087/128; A01F 29/00; A01F 29/005; B65B 69/0025; B65B 69/0033
USPC .......... 37/405; 414/24.5, 24.6, 111, 462, 620, 414/666, 703, 736, 744.6, 910–911; 472/107
See application file for complete search history.

(56) References Cited

U.S. PATENT DOCUMENTS

| | | | |
|---|---|---|---|
| 2,916,167 A * | 12/1959 | Graham | .................. 414/247 |
| 4,027,773 A | 6/1977 | Kenworthy | |
| 4,040,534 A * | 8/1977 | Kenworthy | .................. 414/703 |
| 4,091,947 A | 5/1978 | Fischer | |
| 4,161,253 A | 7/1979 | Ralston et al. | |
| 4,210,209 A | 7/1980 | van der Lely | |
| 4,236,613 A | 12/1980 | van der Lely | |
| 4,306,825 A | 12/1981 | Yilit | |
| 4,613,278 A * | 9/1986 | Bilsing | .................. 414/736 |
| 4,682,806 A * | 7/1987 | Thomas et al. | .................. 294/195 |
| 5,029,650 A | 7/1991 | Smit | |
| 5,178,505 A | 1/1993 | Smith | |
| 7,182,568 B2 | 2/2007 | McGinnes | |
| 7,753,636 B2 | 7/2010 | Hennig | |
| 8,444,362 B2 | 5/2013 | Hennig | |

FOREIGN PATENT DOCUMENTS

| | | | |
|---|---|---|---|
| GB | 2193266 A | * | 2/1988 |
| GB | 2204557 A | * | 11/1988 |
| WO | WO 8906499 A | * | 7/1989 |

* cited by examiner

*Primary Examiner* — Gregory Adams
(74) *Attorney, Agent, or Firm* — Albert W. Watkins (57) ABSTRACT

A fork-type dual bale lift has both longitudinal and machinery pivots. A frame structure is mounted on a vertically swinging load support. A boom member is coupled to the frame structure through a pair of bearings and is pivotal about the longitudinal machine axis. At the ends of the boom member are bale supports that are operative to pierce and support a large bale for lifting and transport. A hydraulic cylinder is used to control the pivotal orientation of the boom about the longitudinal machine axis, and thereby allow an operator to selective raise one of the two bale supports while simultaneously lowering the other of the two bale supports. At the extremes of boom rotation, the lower of the two bale supports additionally engages with the frame structure to provide increased strength and stability during loading and unloading, and to reduce stress on the bearings during transport.

10 Claims, 4 Drawing Sheets

DUAL BALE LIFT WITH LONGITUDINAL AND MACHINERY PIVOTS

BACKGROUND OF THE INVENTION

1. Field of the Invention

The invention pertains generally to the field of material or article handling, and more particularly to round hay bale handling. A manifestation of the present invention is mounted on a vertically swinging load support such as a common tractor three-point hitch, and incorporates a fork-type hay retainer that is laterally tiltable, and has a novel boom structure.

2. Description of the Related Art

Throughout the ages mankind has derived much benefit from animals, ranging from companionship and security from the trusted dog to a vital source of food and raw materials. While pre-historic man is thought to have been a hunter and gatherer, reliance upon random events of nature has not been accepted by mankind. Instead, people have developed ways to keep and care for animals to ensure their availability, which provides synergistic benefit to both man and animal. This is referred to as animal husbandry, which is simply caring for the needs of animals. Animal husbandry is very old, almost certainly predating any written histories.

A critical component of animal husbandry is providing a food source for the animals, regardless of the season. In many locales and climates, this will generally require the gathering and storing of food to carry the animals through inclement seasons and periods of weather. One way this is practiced is by growing a crop that is abundant beyond the immediate or short term needs of the animals during milder seasons. The excess crops are then collected or harvested for consumption or storage until needed.

In the handling of agricultural crops such as hay or straw, it is common practice to cut the crop during a first pass through the field. During a subsequent pass, the crop will be raked into windrows. After the crop has had sufficient time to dry, then it is normally baled. With older baling equipment, relatively small rectangular bales were created. These bales were commonly manually loaded onto and from trailers, and some more recent equipment assisted with such loading and unloading.

In order to further reduce the amount of labor needed to harvest a crop, and thereby improve the efficiency and lower the cost of production, machines have been developed and refined which vastly reduce the time required to accomplish the work. One of these is a hay baler that produces very heavy and large generally cylindrical hay bales. Owing to the enormous size and weight of these bales, machinery is required to lift and move the bales from the fields where they are produced. While the present invention will be described specifically with reference to hay bales, it will be understood that the present invention is not solely limited thereto. Other agricultural crops such as cotton and various kinds of straw are similarly baled. Consequently, the present invention may be applied to any baled agricultural crop, and to non-agricultural bales as well.

Many industries, including agriculture, use front-end loaders and tractors. These machines are highly versatile, including an engine for locomotion and various couplers that allow additional useful equipment to be attached thereto. Generally configured with a front end bucket which may be attached or detached to allow other equipment to be used, these machines are capable of transporting many thousands of pounds of materials. Most loaders are capable of maneuvering about in relatively small spaces, further adding to their versatility. The bucket is useful for scooping from large piles or smooth surfaces, and so may be used not only for moving materials about but also for cleaning up surfaces.

A common agricultural tractor will also typically have or may readily be provided with a three-point hitch which is designed to connect a variety of implements to the tractor. The three-point hitch typically supports the implements by coupling through two lower links or lift arms that are on opposed sides of the longitudinal and vertical center plane of the tractor, and an upper link or stabilizer arm that is located within the vertical center plane of the tractor and defines the third hitching point. This type of hitch will also typically have one or more hydraulic cylinders that permit the operator to raise the three-point hitch. Most also include a hydraulic cylinder that enables the operator to control the fore and aft tilt of the implement. Some of these three-point hitches require specific pinning or coupling to the implement, while others are of the quick-attaching or quick-coupling type. Exemplary United States patents illustrating three-point hitches, the teachings and contents which are incorporated herein by reference, include: U.S. Pat. No. 4,210,209 by van der Lely, entitled "Agricultural implement"; U.S. Pat. No. 4,236,613 by van der Lely, entitled "Coupling member"; and U.S. Pat. No. 5,029,650 by Smit, entitled "Adjustable quick attaching hitch coupler".

Other United States patents illustrate three-point hitches and apparatus to transport a single bale, the teachings and contents which are incorporated herein by reference, including: U.S. Pat. No. 4,027,773 by Kenworthy, entitled "Baled hay loading and transport device"; U.S. Pat. No. 4,161,253 by Ralston et al, entitled "Carrier and dispenser for cylindrical bales"; and U.S. Pat. No. 5,178,505 by Smith, entitled "Three-point hitch attachment with hay mover". While these patents illustrate various bale handling apparatus, these apparatus are limited to supporting a single bale. As may be apparent, the ability to load two or even three bales onto a vehicle or machine can, for exemplary purposes, reduce the amount of transport time required to clear a harvested field of bales and transport the bales to a storage area to one-half or one-third of that required when transporting a single bale.

Some artisans have designed apparatus which couple with a three-point hitch and onto which two bales can be loaded. Exemplary United States patents, the teachings and contents which are incorporated herein by reference, include: U.S. Pat. No. 4,091,947 by Fischer, entitled "Tractor mounted multiple bale carrier"; U.S. Pat. No. 4,306,825 by Yilit, entitled "Round bale handling apparatus"; U.S. Pat. No. 7,182,568 by McGinnes, entitled "Bale handling apparatus"; U.S. Pat. No. 7,753,636 by Hennig, entitled "Adjustable bale mover spikes"; and U.S. Pat. No. 8,444,362 by Hennig, entitled "Round bale mover".

The Fischer patent describes three pairs of forks, each pair which can be used to scoop under and lift a bale. While relatively unique in the ability to transport three bales on the three-point hitch, the apparatus is relatively complex. At least two of the bales, 81 and 82 in the Fischer figures, must be properly positioned adjacent to each other prior to loading. Further, critical moving components are down adjacent to the ground where these components are most likely to be damaged or contaminated with dirt and sand.

In contrast, the Yilit patent illustrates a much simpler construction having critical pivot points generally higher above the ground than the Fischer construction. However, the Yilit apparatus necessarily shifts the bales farther behind the rear wheels, substantially increasing the tendency towards rear tipping and also increasing the strength required of the bale supporting components.

The McGinnes apparatus has a most simple construction, completely avoiding moving parts other than the three-point hitch, and is capable of transporting two bales simultaneously. However, the bales cannot be selectively loaded and unloaded, since the highest main spear must be loaded first and unloaded last.

Hennig in U.S. Pat. No. 7,753,636 illustrates an apparatus coupled to a three-point hitch and capable of independently lifting two bales. However, this Hennig apparatus requires two hydraulic cylinders, one for each bale's associated pair of spears. Further, the apparatus uses linear bearings that are difficult to keep clean and lubricated and which are likely to bind and gall.

Hennig in U.S. Pat. No. 8,444,362 has provided substantial improvement over the previous apparatus, enabling the separation between an adjacent pair of bales to be variable both during loading and unloading. Unfortunately, this once again requires a plurality of hydraulic cylinders, one pair for swiveling each bale support closer to or farther from the tractor central longitudinal axis, and another pair for independent elevation control of each bale.

Of the foregoing two-bale handlers, only Hennig in U.S. Pat. No. 8,444,362 is capable of shifting a bale closer to the tractor central longitudinal axis during loading, but this is accomplished with significant complexity and the need for four hydraulic cylinders and several bearing or bushing sets. While these two-bale patents each improve upon the single bale prior art apparatus, a simpler, reliable, durable and safe two-bale lift and transport is still very much desired in the industry.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is, in combination, a tractor having a motive power source, a three-point hitch having a pair of lift arms and a stabilizer arm, and a dual bale lift having longitudinal and machinery pivots. The dual bale lift comprises a transversely positioned upstanding frame having mounting means connected to the lift arms and stabilizer arm. A boom member is pivotally connected to the frame for pivotal movement about a boom pivot axis generally parallel to a tractor longitudinal axis and in a plane generally parallel to the frame. A pair of bale supports are adjacent to the ends of the boom member that are operative to pierce and support a large bale for lifting and transport. A hydraulic cylinder is coupled between the boom member and frame, and is operative to control a pivotal orientation of the boom member about the boom pivot axis, and thereby allow an operator to selective raise a first one of the two bale supports, while simultaneously lowering a second one of the two bale supports.

In a second manifestation, the invention is, in combination, a motive vehicle having a longitudinal axis generally defining forward and backward directions of travel; a three-point hitch adapted to operatively couple with and be transported by the motive vehicle and having lifting and stabilizer arms; and a dual bale lift adapted to operatively couple with and movable by the three-point hitch lifting and stabilizer arms. The dual bale lift has a frame coupled with said three-point hitch. A pivot defines a pivotal axis that is generally parallel to the motive vehicle longitudinal axis. A boom member has a body, a first end terminating the body, and a second end terminating the body distal to the first end. The boom member is pivotally coupled to the frame through the pivot at a location intermediate to the first and second ends. A first bale retainer is adapted to operatively retain baled matter and is coupled to the first boom member end. A second bale retainer is adapted to operatively retain baled matter and is coupled to said second boom member end. A motive actuator is coupled to the frame and to the boom member intermediate the pivot and a one of the first and second bale retainers, and is adapted to operatively pivot the boom member about the pivotal axis.

In a third manifestation, the invention is a fork-type dual bale lift adapted for use with hay, cotton and other similar bales. A frame has a generally horizontally extending member that terminates at distal ends, and a vertical riser rising from the generally horizontally extending member between distal ends. A pivot defines a pivotal axis and is coupled to the vertical riser distal to the generally horizontally extending member. A boom member has a body and a first end terminating the body and a second end terminating the body distal to the first end. The boom member is pivotally coupled to the frame through the pivot at a location intermediate to the first and second body ends. A first bale retainer is adapted to operatively retain baled matter and is coupled to the first boom member end. A second bale retainer is adapted to operatively retain baled matter and is coupled to the second boom member end. A motive actuator is coupled to the frame and to the boom member intermediate the pivot and a one of the first and second bale retainers, and is adapted to operatively pivot the boom member about the pivotal axis.

OBJECTS OF THE INVENTION

Exemplary embodiments of the present invention solve inadequacies of the prior art by providing a dual bale lift with longitudinal and machinery pivots. A fork-type bale retainer adapted for use with hay, cotton and other similar bales has a frame structure mounted on a vertically swinging load support such as a common tractor three-point hitch. A boom member is coupled to the frame structure through a pair of bearings and is pivotal about the longitudinal machine axis. At the ends of the boom member are bale supports that are operative to pierce and support a large bale for lifting and transport. A hydraulic cylinder is used to control the pivotal orientation of the boom about the longitudinal machine axis, and thereby allow an operator to selective raise one of the two bale supports, while simultaneously lowering the other of the two bale supports. At the extremes of boom rotation, the lower of the two bale supports additionally engages with the frame structure to provide increased strength and stability during loading and unloading, and to reduce stress on the bearings during transport.

A first object of the invention is to provide an attachment for a three-point hitch such as may be used on a farm tractor or other vehicle. A second object of the invention is to provide on the attachment a pair of apparatus adapted to engage with a bale, where the apparatus might for exemplary purposes include but not be limited to a fork or other plurality of tines or spears and where the bale might for exemplary purposes include but not be limited to a hay bale, straw bale, cotton bale or other agricultural or non-agricultural bale. A further object of the invention is to enable the attachment to pivot about an axis generally parallel with the longitudinal axis of the tractor so that when one of the pair of apparatus will lower to the ground the other of the pair of apparatus will be raised from the ground. Another object of the present invention is to enable both of the pair of apparatus to be raised from and lowered to the ground simultaneously and to be tilted fore and aft, the raising, lowering and fore-aft tilting preferably using the three-point machinery hitch coupled with the vehicle. Yet another object of the present invention is to provide an apparatus of relatively simple construction that is reliable and very unlikely to bind. A further object of the invention is to load and unload a bale relatively closer to the central longitudinal axis of the tractor, while transporting the bale farther therefrom, to allow the bales to be more safely loaded and unloaded, while also permitting the bales to be tightly stacked prior to and subsequent of loading on the bale lift. Another object of the invention is to keep the bales as forward on the tractor as possible, to avoid an excessive rear tipping moment about the rear wheels of the tractor, to preserve stability and safety. An additional object of the invention is to allow the selectively loading and unloading of one of the pair of apparatus engaging with the bales, such that one bale at a time may be either loaded or unloaded. Another object of the invention is to engage the stabilizer tines with the lower main support beam to increase strength and stability during loading unloading, and transport.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
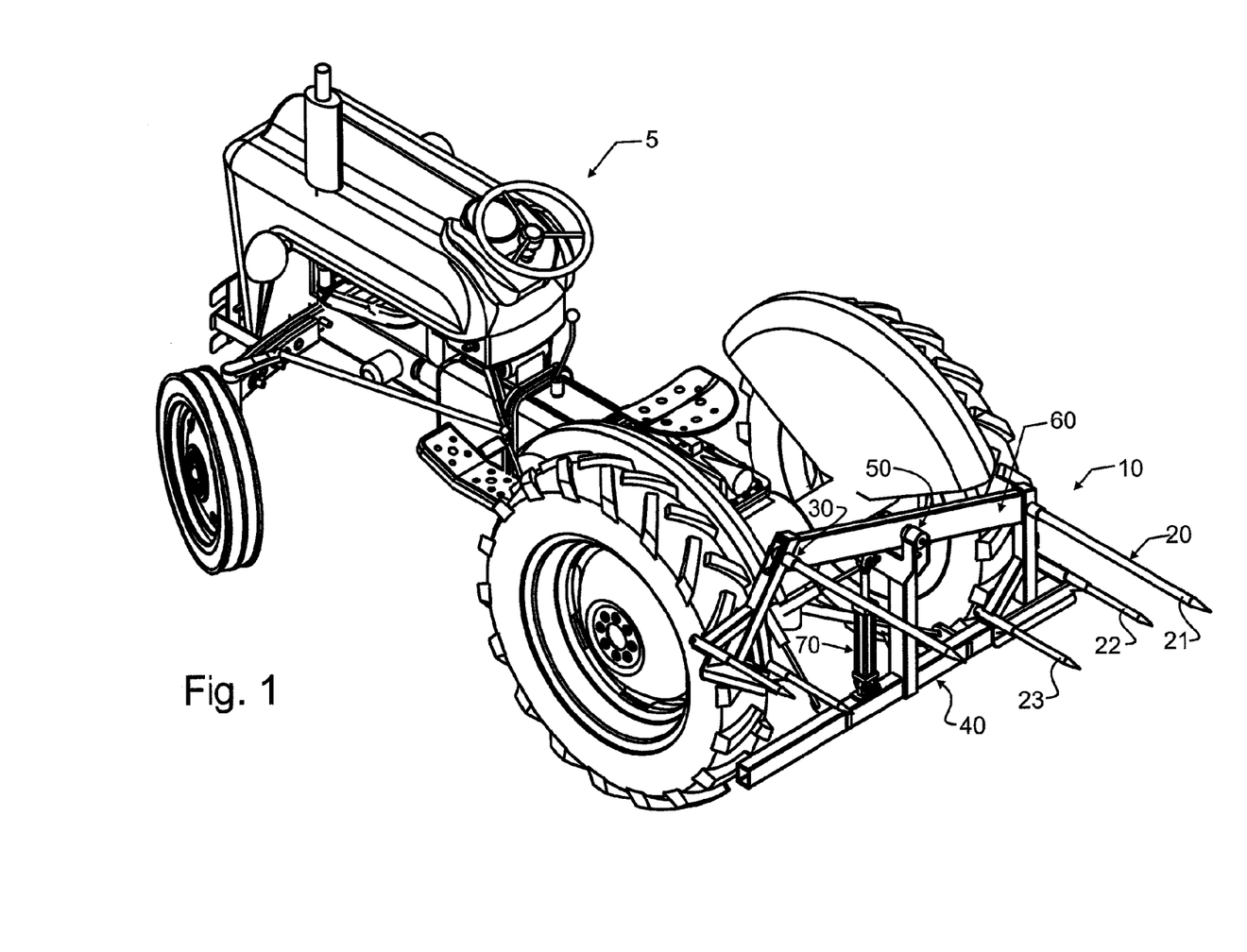
FIG. 1 illustrates a preferred embodiment dual bale lift with longitudinal and machinery pivots in combination with a prior art tractor from an isometric view.
Figure 5:
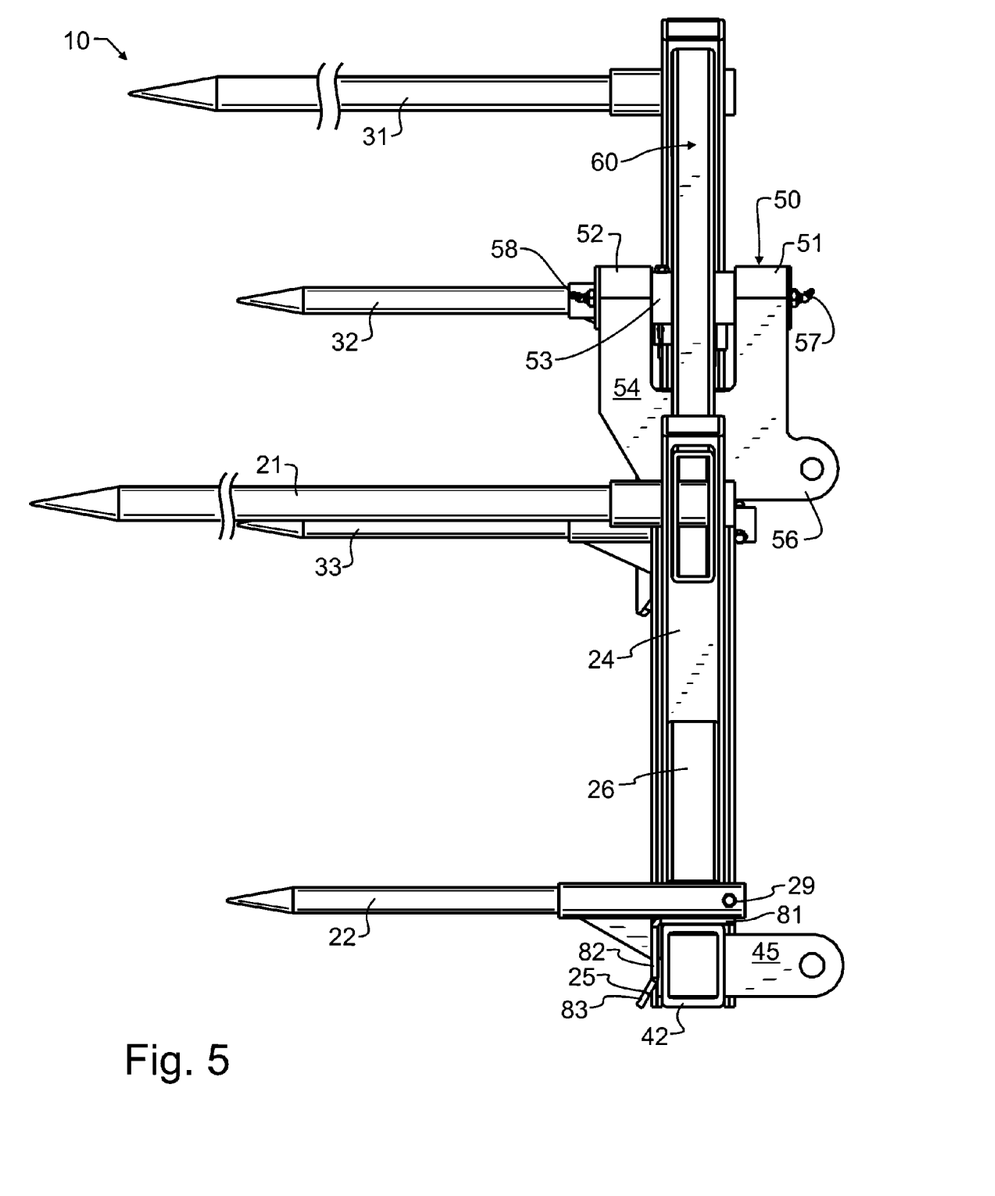
FIG. 5 illustrates the preferred embodiment dual bale lift with longitudinal and machinery pivots of FIG. 2 from a side elevational view, and in the same as illustrated right bale support loading position of FIGS. 2 and 3.

Manifested in the preferred embodiment illustrated in FIG. 1, the present invention is cooperative with a conventional motive vehicle 5, which may be a machine such as a tractor, skid steer, loader or other suitable machine. The motive vehicle 5 will preferably be provided with a conventional three-point hitch. The preferred embodiment dual bale lift 10, which has been designed in accord with the teachings of the present invention, is supported upon motive vehicle 5. As illustrated and most preferred, dual bale lift 10 is coupled through the three-point hitch to motive vehicle 5, which will permit complex motions as will be described herein below. The prior art three-point hitch apparatus operatively couples tractor lifting arms to lifting couplers 44, 45 visible in FIG. 2, and operatively couples a stabilizer arm to stabilizer coupling 56 visible in FIG. 5. Nevertheless, those skilled in the art will also understand from the present disclosure that dual bale lift 10 may alternatively be mounted to the front of motive vehicle 5, such as through a lift arm coupling or the like, as may be commonly used to attach buckets or other apparatus to the front of the loader.

Dual bale lift 10 preferably includes a pair of fork, tine or spear type bale retainers 20, 30 that may be designed and adapted for use with hay, cotton and other similar bales. A frame 40 couples directly with a vertically swinging load support such as a conventional tractor three-point hitch, as illustrated in FIG. 1. A boom member 60 is pivotally coupled to frame 40 structure through a pivot 50, which in the preferred embodiment is defined by a bearing 53 that is visible in FIG. 5. Pivot 50 defines a pivotal axis that is generally parallel to the longitudinal axis of motive vehicle 5. Rigidly coupled to the distal ends of boom member 60 are each of the pair of bale retainers 20, 30. Between the center of boom member 60 and bale retainer 30 is a motive actuator 70, which in the preferred embodiment is a hydraulic cylinder. Actuator 70 may be offset to either side from the pivot of boom member 60, and the pivot is not required to be centered along boom member 60. Instead, these locations are exemplary and a part of the preferred embodiment, but are not limiting to the present invention.

Figure 2:
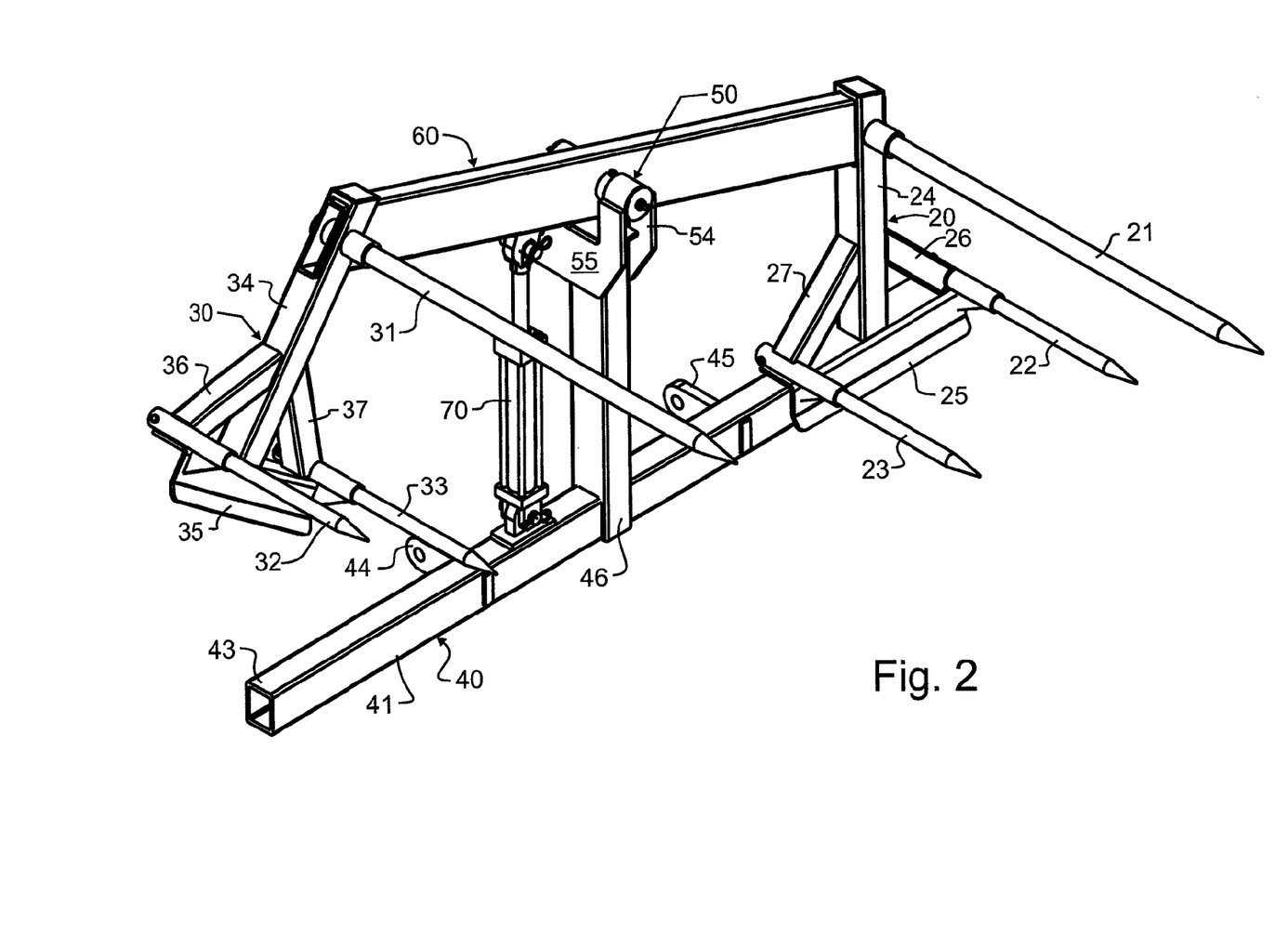
FIG. 2 illustrates the preferred embodiment dual bale lift with longitudinal and machinery pivots of FIG. 1 from an isometric view.
Figure 3:
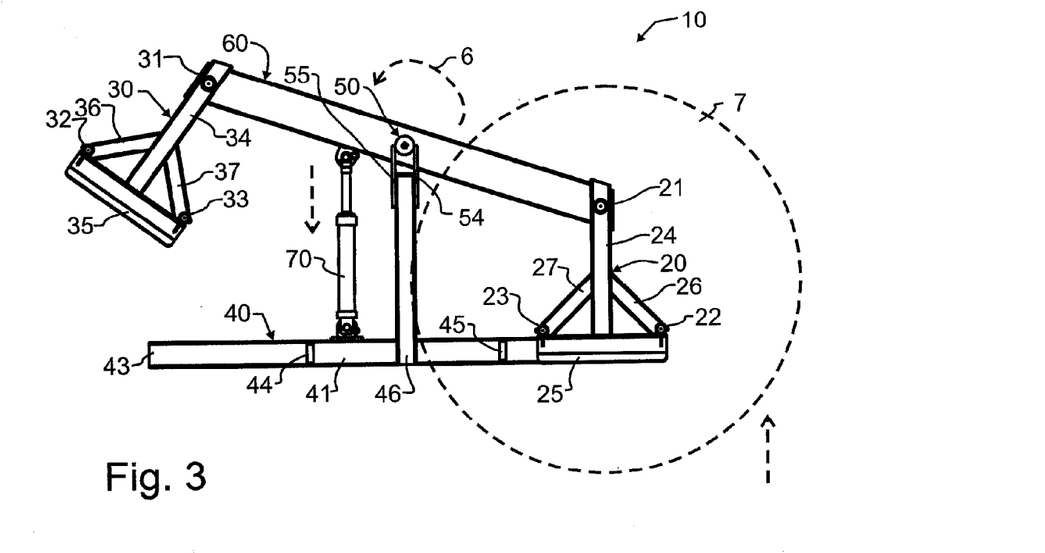
FIG. 3 illustrates the preferred embodiment dual bale lift with longitudinal and machinery pivots of FIG. 2 from a rear elevational view, and with the as illustrated right bale support in the loading position.

Actuator 70 is used to control the pivotal orientation of boom member 60 about pivot 50, and thereby allow an operator to selective raise one of the two bale retainers 20, 30, while simultaneously lowering the other of the two bale retainers 20, 30. At the extremes of boom rotation, the lower of the two bale retainers 20, 30 additionally engages with frame 40 to provide increased strength and stability during loading and unloading, and to reduce stress on the bearings during transport. This is illustrated in FIGS. 1, 2 and 3 with bale retainer 20 resting against frame 40, and in FIG. 4 with bale retainer 30 resting against frame 40.

Bale retainer 20 has a main tine or spear 21 which is operative to pierce and support a large bale for lifting and transport. This main spear 21 is designed to provide the majority of support for the bale. A pair of stabilizing tines 22, 23 are provided that primarily prevent a bale such as bale 7 from undesirably spinning or shifting relative to main spear 21. In the preferred embodiment, main spear 21 not only passes through vertical frame member 24, but also through boom member 60, gaining increased strength from the combination of supporting structures. Main spear 21 and stabilizing tines 22, 23 may be coupled to bale retainer 20 through a tubular structure encompassing the tines and spear, with a retaining device or cotter pin holding them in place, and that might, for exemplary purposes, pass through hole 29 holding tine 22 in place. Nevertheless, any suitable means including but not limited to welding, threading or any of the myriad of known coupling apparatus may be used to hold main spear 21 and tines 22, 23 to bale retainer 20. Where removable couplings are used, such as pins, threading, or other removable fasteners, accidentally broken or bent spears and tines may more readily be replaced. Stabilizing tines 22, 23 are offset from vertical frame member 24 by angled frame members 26, 27 respectively. The combination of vertical frame member 24, angled frame members 26, 27, and strike plate 25 form a strong and stable support that is able to withstand the weight and forces induced by a large bale 7 during loading and transport. Bale retainer 30 has like features and members, identified by same ones digit as bale retainer 20, but with the tens digit renumbered to 30 for reference purposes.

Frame 40 has a generally horizontally extending member 41 that terminates at distal ends 42, 43. A vertical riser 46 is located somewhere between distal ends 42, 43, and in the preferred embodiment generally intermediate there between.

A pair of lifting couplers 44, 45 of any suitable geometry are provided for engagement with lifting arms on motive vehicle 5.

Adjacent to the upper end of vertical riser 46 is a pivot 50 which comprises a pair of bearing blocks 51, 52 supporting a bearing 53 that may have one or more bearings or bushing surfaces therein. In the preferred embodiment, a pair of grease zerks 57, 58 are provided to facilitate periodic lubrication of this critical pivot 50. Two opposed plates 54, 55 wrap about and couple to vertical riser 46, while also defining stabilizer coupling 56.

In operation, a person may ride upon motive vehicle 5, and raise and lower dual bale lift 10 through the operation of the conventional three-point hitch or front end loader apparatus. Furthermore, preferably the fore and aft tilt of dual bale lift will also be controlled by the operator using these conventional couplings. Dual bale lift 10 will be tilted along the longitudinal axis of pivot 50, which as aforementioned is generally parallel to the longitudinal axis of motive vehicle 5.

Bale retainer 20 is lowered into engagement with horizontally extending frame member 41 by extending motive actuator 70 to the positions illustrated in FIGS. 1-3 and 5. In this position, strike plate 25 rests against the rearward face of the distal end 42 of horizontally extending member 41. This engagement is illustrated clearly in the side view of FIG. 5, though visible in the other Figures as well. Particularly noteworthy here is that at the extremes of boom member 60 rotation, the lower of the two bale retainers 20, 30 additionally engages with frame 40 through strike plates 25, 35, respectively, to provide increased strength and stability during loading and unloading, and to reduce stress on the bearings during transport. This is illustrated in FIGS. 1-3 and 5 with bale support 20 resting against frame 40, and in FIG. 4 with bale support 30 resting against frame 40.

Most preferably, the motive vehicle coupling such as the three-point hitch is adjusted for fore/aft tilt so that main spear 21 extends rearward from motive vehicle 5 in a generally horizontal axis. This is the position illustrated in FIG. 3. Next, motive vehicle 5 is backed up so that main spear 21 is properly aligned with a bale 7, and then continued to be further backed up, thereby driving main spear 21 and stabilizing tines 22, 23 into bale 7. This secures bale 7 to bale retainer 20 and dual bale lift 10.

Noteworthy here is the fact that bale 7 has been engaged most closely to the center of dual bale lift 10, adjacent to vertical riser 46, which reduces the amount of torque that will be generated during the spearing operation. While bale 7 may only be slightly closer to vertical riser 46, torque is measured in units of distance and force, such as foot-pounds. An increase in distance from vertical riser 46 of ten percent will equate to ten percent more torque that must be endured by dual bale lift 10. As may be apparent, this movement of bale retainers 20, 30 closer to center is of significant advantage in the overall size, weight, and expense required to produce a quality bale lifter. This is also true for the transport position, which is the same as a loading position such as that of FIG. 3 or FIG. 4, and thereby tends to keep both bales 7 and 8 closer to in line with vertical riser 46.

Next, the operator will engage a control to retract motive actuator 70 in the direction illustrated by the dashed arrow of FIG. 3, which in turn causes the rotation of boom member 60 about pivot 50 as shown by dashed arrow 6 of FIG. 3. This raises bale retainer 20 and thereby lifts bale 7 from the earth to the position illustrated in FIG. 4. From this position, the operator can then move about without dragging bale 7 on the earth. This also lowers bale retainer 30 down, engaging strike plate 35 with distal end 43 of horizontally extending member 41.

The operator will then align with the next bale 8, and repeat the backing operation to spear bale 8. Forces will be transmitted through bale retainer 30 into boom 60 and frame 40, thereby avoiding damage to bale retainer 30.

Finally, the operator could control motive actuator 70 to raise boom member 60 back to a generally horizontal position. In this position, both bales 7, 8 will be supported above the ground and motive vehicle 5 may be driven about.

Figure 4:
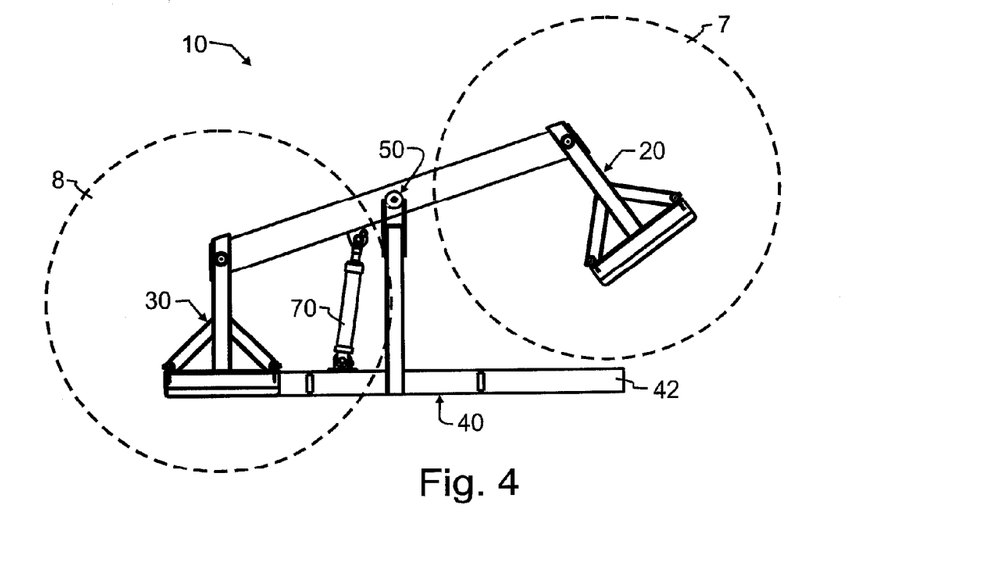
FIG. 4 illustrates the preferred embodiment dual bale lift with longitudinal and machinery pivots of FIG. 2 from a rear elevational view, and with the as illustrated left bale support in the loading position.

However, the operator will instead preferably leave the boom member 60 either in the position of FIG. 3 or FIG. 4, so that one of strike plate 25 and strike plate 35 are resting on and engaged with horizontally extending member 41. This allows horizontally extending member 41 to cooperatively support the bale retainers 20, 30 and boom member 60. As visible in FIG. 5, strike plates 25, 35 are formed in an angle having a generally horizontal face 81 and a generally vertical face 82 to wrap about both the top and rear face of horizontally extending member 41. Strike plates 25, 35 additionally preferably have a slight rearward tending lip 83 at the bottom thereof, which helps to ensure that even if there is a slight twisting in boom member 60, the strike plates 25, 35 will still drop down properly onto horizontally extending member 41.

To keep the bales up above the uneven ground, the operator will instead preferably change the fore/aft tilt of the three-point hitch or other coupling so that main spears 21, 31 tilt slightly upward, which helps to further gravitationally retain bales 7, 8 thereon. This additionally causes a slight forward shift of the center of mass, which will reduce the amount of front wheel lifting that is produced by dual bale lift 10 when fully loaded with bales 7, 8.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. In combination, a tractor having a motive power source, a three-point hitch having a pair of lift arms and a stabilizer arm, and a dual bale lift having longitudinal and machinery pivots, said dual bale lift comprising:

a transversely positioned upstanding frame having a generally horizontally extending member that terminates at distal ends, a vertical riser rising from said generally horizontally extending member between said distal ends, and mounting means connected to said lift arms and said stabilizer arm;

a boom member pivotally connected to said frame for pivotal movement about a boom pivot axis generally parallel to a tractor longitudinal axis and in a plane generally parallel to said frame;

a pair of bale supports adjacent to the ends of the boom member that are operative to pierce and support a large bale for lifting and transport, each of said pair of bale supports having a strike plate, each one of said first and second strike plates having a generally horizontal face, a generally vertical face, and an angled lip extending from said generally vertical face, said angled lip adapted to operatively accommodate limited twist in sad vertical riser and said boom member and thereby facilitate engagement with said generally horizontally extending member, a first one of said strike plates defining a first limit of rotation of said boom member by operatively engaging with said generally horizontally extending member adjacent a first end of said generally horizontally extending member when said boom member reaches said first limit of rotation, and a second one of said strike plates defining a second limit of rotation of said boom member distal to said first limit of rotation by operatively engaging with said generally horizontally extending member adjacent a second end of said generally horizontally extending member distal to said first end when said boom member reaches said second limit of rotation; and a hydraulic cylinder coupled between said boom member and said frame, and operative to control a pivotal orientation of said boom member about the boom pivot axis, and thereby allow an operator to selective raise a first one of said two bale supports, while simultaneously lowering a second one of said two bale supports.

2. The combination tractor, three-point hitch, and dual bale lift of claim 1, wherein said pair of bale supports each further comprise a main spear which is operative to pierce and support a large bale for lifting and transport, and adapted to provide a majority of support for lifting and transporting said large bale, said main spear adapted to operatively pass through and couple with said transversely positioned upstanding frame and said boom member.

3. In combination,
a motive vehicle comprising a tractor having a longitudinal axis generally defining forward and backward directions of travel;
a three-point hitch adapted to operatively couple with and be transported by said motive vehicle and having lifting and stabilizer arms; and
a dual bale lift adapted to operatively couple with and movable by said three-point hitch lifting and stabilizer arms, said dual bale lift comprising:
a frame coupled with said three-point hitch;
a pivot which defines a pivotal axis that is generally parallel to said motive vehicle longitudinal axis;
a boom member having a body and a first end terminating said body and a second end terminating said body distal to said first end, said boom member pivotally coupled to said frame through said pivot at a location intermediate to said first and second ends;
a first bale retainer adapted to operatively retain baled matter and coupled to said first boom member end and having a first strike plate defining a first limit of rotation of said boom member by operatively engaging with said frame adjacent a first end of a generally horizontally extending member when said boom member reaches said first limit of rotation;
a second bale retainer adapted to operatively retain baled matter and coupled to said second boom member end and having a second strike plate defining a second limit of rotation of said boom member distal to said first limit of rotation by operatively engaging with said frame adjacent a second end of said generally horizontally extending member distal to said first end when said boom member reaches said second limit of rotation; and
a motive actuator coupled to said frame and to said boom member intermediate said pivot and a one of said first and second bale retainers and adapted to operatively pivot said boom member about said pivotal axis;
wherein each of said first and second strike plates further comprise a generally horizontal face, a generally vertical face, and an angled lip extending from said generally vertical face, said angled lip adapted to operatively accommodate limited twist in sad vertical riser and said boom member and thereby facilitate engagement with said generally horizontally extending member.

4. The combination motive vehicle, three-point hitch, and dual bale lift of claim 3, wherein said baled matter further comprises a generally cylindrical bale of hay having a size and mass greater than that which could be generally manually lifted.

5. The combination motive vehicle, three-point hitch, and dual bale lift of claim 3, wherein said pivot further comprises a bearing.

6. The combination motive vehicle, three-point hitch, and dual bale lift of claim 3, wherein said actuator further comprises a hydraulic cylinder.

7. The combination motive vehicle, three-point hitch, and dual bale lift of claim 3, wherein said actuator controls a pivotal orientation of said boom member about said pivot and is thereby adapted to operatively selectively raise a first one of said first and second bale retainers while simultaneously lowering a second one of said first and second bale retainers.

8. The combination motive vehicle, three-point hitch, and dual bale lift of claim 3, wherein said bale retainer further comprises a main spear which is adapted to operatively pierce and support a large bale for lifting and transport, and to provide a majority of support for said large bale, said main spear passing through said frame and said boom member.

9. A fork-type dual bale lift adapted for use with hay, cotton and other similar bales, comprising:
a frame having a generally horizontally extending member that terminates at distal ends, and a vertical riser rising from said generally horizontally extending member between said distal ends;
a pivot that defines a pivotal axis and that is coupled to said vertical riser distal to said generally horizontally extending member;
a boom member having a body and a first end terminating said body and a second end terminating said body distal to said first end, said boom member pivotally coupled to said frame through said pivot at a location intermediate to said first and second body ends;
a first bale retainer adapted to operatively retain baled matter and coupled to said first boom member end and having a first strike plate defining a first limit of rotation of said boom member by operatively engaging with said frame adjacent a first end of a generally horizontally extending member when said boom member reaches said first limit of rotation;
a second bale retainer adapted to operatively retain baled matter and coupled to said second boom member end and having a second strike plate defining a second limit of rotation of said boom member distal to said first limit of rotation by operatively engaging with said frame adjacent a second end of said generally horizontally extending member distal to said first end when said boom member reaches said second limit of rotation; and
a motive actuator coupled to said frame and to said boom member intermediate said pivot and a one of said first and second bale retainers and adapted to operatively pivot said boom member about said pivotal axis;
wherein each of said first and second strike plates further comprise a generally horizontal face, a generally vertical face, and an angled lip extending from said generally vertical face, said angled lip adapted to operatively accommodate limited twist in sad vertical riser and said boom member and thereby facilitate engagement with said generally horizontally extending member.

10. The fork-type dual bale lift of claim 9, wherein said actuator controls a pivotal orientation of said boom member about said pivot and is thereby adapted to operatively selectively raise a first one of said first and second bale retainers while simultaneously lowering a second one of said first and second bale retainers.

\* \* \* \* \*